Sept. 3, 1957    P. HARTMANN    2,804,759
COUPLING
Filed May 27, 1953    2 Sheets-Sheet 1
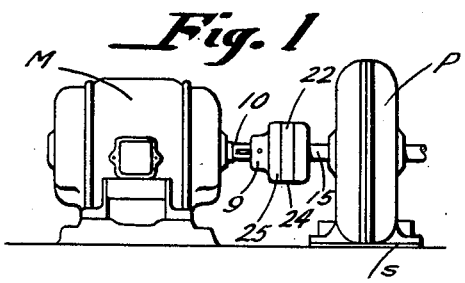
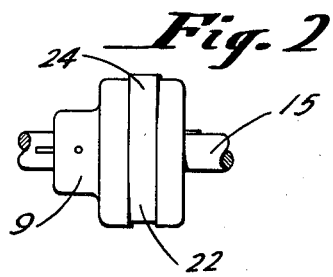
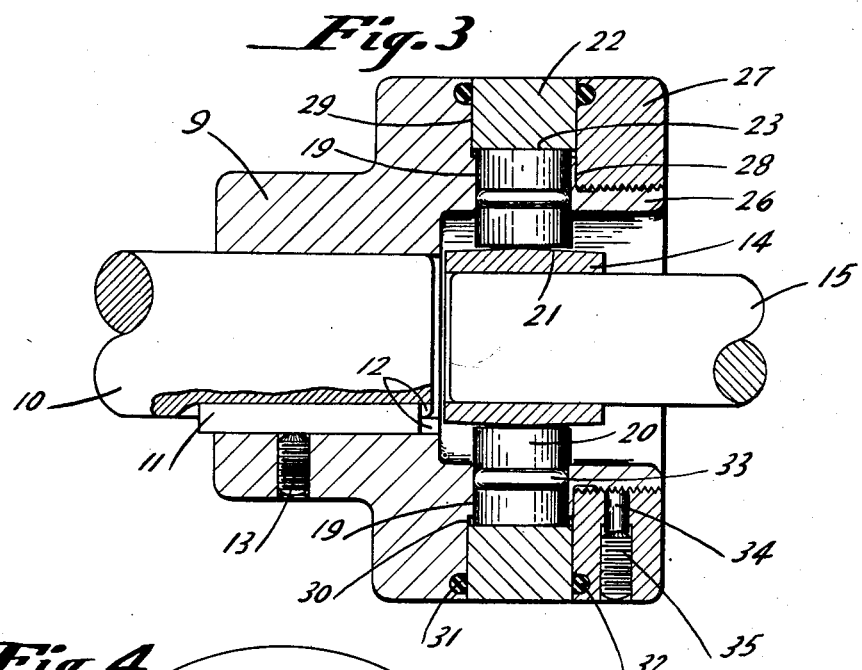
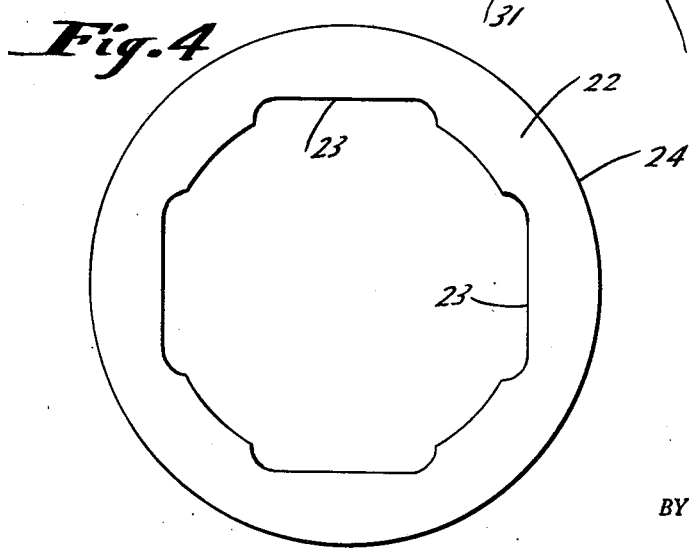
INVENTOR.
Philip Hartmann
BY
Charles & French
Att'ys.

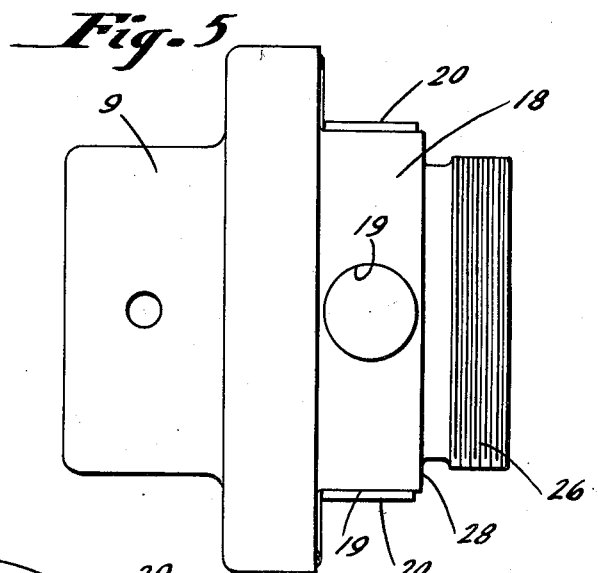
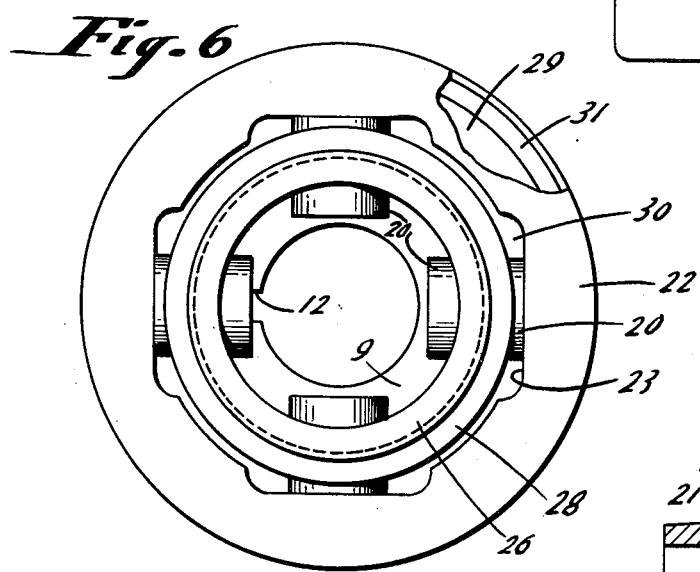
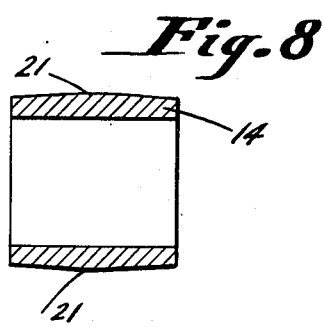
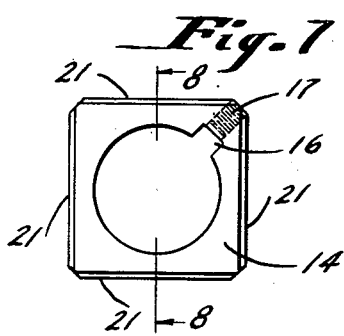

United States Patent Office 2,804,759
Patented Sept. 3, 1957

2,804,759

COUPLING

Philip Hartmann, Racine, Wis., assignor to Hartmann Manufacturing Company, Racine, Wis., a corporation of Wisconsin Application May 27, 1953, Serial No. 357,685

7 Claims. (Cl. 64—7)

The invention relates to shaft couplings and more particularly to couplings of the fixed type.

The main object of the invention is to provide a shaft coupling by which a drive member and a driven member may be readily coupled thereto in axial alinement with each other through indicating means in the coupling by which either the drive or the driven member may be adjusted relative to the other until these members are in proper alinement. More particularly, the coupling of this invention includes an axially movable indicator member which is responsive to movement of one of the members to be coupled and which in the alined position of the members alines with a truing surface of the other member.

In the drawings:

Fig. 1 is an elevation view of units connected together by the coupling embodying the invention;

Fig. 2 is an elevation view of the coupling before bringing it to its proper drive position;

Fig. 3 is a vertical sectional view through the coupling;

Fig. 4 is a plan view of the indicator ring;

Fig. 5 is an elevation view of one of the shaft connectors;

Fig. 6 is an end view of the part shown in Fig. 5 with the indicator ring mounted thereon;

Fig. 7 is an end view of the other shaft connector;

Fig. 8 is a vertical sectional view taken on the line 8—8.

Referring to the drawings, the coupling includes a member 9 for connection with a shaft 10 as by a key 11 mounted in alined keyways 12 in said shaft and member and locked in position by a set screw 13 and a member 14 for connection with the other shaft 15 by a similar keyed connection including the keyway 16 and set screw 17.

For establishing a positive drive connection between the members 9 and 14, the member 9 has a cylindrical portion 18 provided with equidistantly spaced bores 19 whose axes are radially disposed relative to the central axis of member 9, said bores being spaced ninety degrees apart and having drive pins 20 mounted for sliding movement therein and adapted to engage surfaces 21 formed on the member 14 which is of generally square section. Surfaces 21 might be flat surfaces engaging the flat inner ends of the pins 20, but in order to compensate for very slight inaccuracies either in one or both of the shafts, the surfaces 21 are preferably made with a slight conical curvature in a lengthwise direction, as shown in Fig. 8, and the pins 20 engage the high points of these surfaces. The pins 20 are all of the same length, and since they bear on the member 14 secured to the shaft 15, if this shaft is out of alinement vertically or laterally with the shaft 10, such misalinement will be reflected by the position of the pins 20 relative to each other, that is, the outer ends of the pins will not be equally radially spaced from the axis of the shaft 10 or 15.

The exact position of the pins 20 is indicated to the operator by an indicator member 22 which as shown is in the form of a ring but which might take other forms and be within the spirit of the invention. Member 22 is provided with equidistantly spaced flat surfaces 23 against which the outer ends of the pins 20 abut so that a thrust imparted to any one or more of the pins will move the ring 20 in the direction of thrust. The outer periphery 24 of ring 22 is of exactly the same diameter as the adjacent periphery 25 of the member 9, so that when these two surfaces are alined with each other, the pins 20 will all be at the same distance from the axis of the member 14 if that member is in true axial alinement with the axis of member 9.

For holding the indicator ring 22 in position on the member 9, this member is provided with a threaded end 26 to receive a nut 27 which is turned up to abutting engagement with a stop shoulder 28 so as to space this nut from a shoulder 29 to leave just enough clearance to allow the ring 22 to slide freely between said nut and shoulder 29.

The pins 20 may be kept lubricated by filling the space 30 between said ring and member 9 with oil and retaining the oil therein by sealing O-rings 31 and 32 and O-rings 33 mounted on the pins 20.

The nut or collar 27 may be locked in position by a soft metal plug 34 held against the threads 26 by a set screw 35, and the periphery of this nut may also be turned to the same diameter as the periphery 25.

In Fig. 1 I have shown the coupling above described connecting an electric motor M with a pump P or other device or part to be driven, the shaft 10 being the motor shaft and the shaft 15 being the pump shaft, the pump P having been vertically adjusted by one or more shims S to bring its shaft 15 into alinement with shaft 10 as indicated by the fact that the peripheries 24 and 25 are in alinement. Before making this adjustment, the indicator ring 22 might project more or less from one side of the periphery 25 as indicated in Fig. 2, and then by a careful adjustment by the operator of the pump P either vertically or laterally its shaft 15 is brought into alinement with the shaft 10 when the ring 22 is brought to its true or substantially true concentric position relative to the periphery 25 of the member 9.

With the above arrangement the operator can tell by feel, that is, running his finger across the peripheries 24 and 25 whether the two shafts are alined to within one-thousandth of an inch of true concentricity, and if a higher degree of alinement accuracy is required, the operator may use an indicator on the surface 25 and adjust one or the other of the shafts until they run true with each other.

I desire it to be understood that this invention is not to be limited to any particular form or arrangement of parts except in so far as such limitations are included in the claims.

What I claim as my invention is:

1. In a rotary shaft coupling, the combination of a pair of shafts, a coupling member for each shaft, a drive connection between said members, including a radially movable alinement indicating means slidably mounted on one of said members and sensitive to the axial position of the other of said members through said drive connection and having an exterior surface alineable with a surface of the member on which it is mounted when said coupling members are in axially alined position.

2. In a rotary shaft coupling, the combination of a pair of shafts, a coupling member for each shaft, a drive connection between said members, one of said members having an exterior cylindrical surface whose axis is the axis of said member, said drive connection including a radially movable alinement indicator ring mounted on said member and sensitive to the axial position of the other of said members through said drive connection and having an exterior cylindrical surface alineable with the said exterior surface of said first named member when said coupling members and their shafts are in axially alined position.

3. In a rotary shaft coupling, the combination of a pair of shafts, a coupling member for each shaft, drive pins slidably mounted in one of said members for movement radially relative thereto and engageable at one of their ends with surfaces on the other member, a radially movable indicator member mounted for radial sliding movement on the member carrying said drive pins and having surfaces drivingly engageable with the other ends of said pins, said pins being of equal length and the surfaces on said other member being equidistantly disposed relative to the axis of said member, said first named member having an exterior surface axially alined with its axis and alineable with a surface of said indicator member when said pins are positioned equidistantly from the axis of the other member and the shafts are alined.

4. In a rotary shaft coupling, the combination of a pair of shafts, a coupling member for each shaft, drive pins slidably mounted in one of said members for movement radially relative thereto and having flat faced ends, an indicator ring mounted to slide radially in an annular groove in said member and having inner side flat surfaces engageable with the outer ends of said pins and equidistantly radially disposed from the axis of said member, the other of said coupling members having surfaces drivingly engageable with the inner ends of said pins and equidistant radially disposed from the axis of this member whereby when the axes of the coupling members and their shafts are alined the outer ends of said pins will all be at the same distance from said axes so that the outer surface of said indicator ring will be concentric with the alined axes of said members.

5. The coupling as defined in claim 4, wherein the surfaces on the member engaged by the inner ends of the pins are inclined from their central portion toward their ends.

6. The structure as defined in claim 4, wherein the sides of the groove and surfaces of the pins are sealed against oil leakage, and the space between said ring and the coupling member on which it is mounted forms an oil reservoir.

7. In a rotary shaft coupling, the combination of a pair of coupling members for a pair of shafts, a radially movable drive connection between said members, including a radialy movable indicator means sensitive to the radial movement of said drive connection relative to said coupling members and having an exterior surface alineable with a surface of one of said coupling members when said members and their shafts are in axially alined position.

References Cited in the file of this patent
UNITED STATES PATENTS

| 1,109,836 | Hanson | Sept. 8, 1914 |
| 1,183,681 | Schipper | May 16, 1916 |
| 1,868,587 | Richards | July 26, 1932 |

FOREIGN PATENTS

| 44,094 | France | July 23, 1934 |
| | (Addition to 758,219) | |